(12) United States Patent
Diller et al.

(10) Patent No.: US 10,023,247 B2
(45) Date of Patent: Jul. 17, 2018

(54) STAKE POCKET ANCHOR

(71) Applicant: Curt Manufacturing, LLC, Eau Claire, WI (US)

(72) Inventors: Joel D. Diller, Eau Claire, WI (US); Robert G. Fehr, Colfax, WI (US); Wolfe C. Parzyck, Colfax, WI (US)

(73) Assignee: Curt Manufacturing, LLC, Eau Claire, WI (US)

( * ) Notice: Subject to any disclaimer, the term of this patent is extended or adjusted under 35 U.S.C. 154(b) by 12 days.

(21) Appl. No.: 15/338,193

(22) Filed: Oct. 28, 2016

(65) Prior Publication Data

US 2017/0120961 A1 May 4, 2017

Related U.S. Application Data

(60) Provisional application No. 62/248,514, filed on Oct. 30, 2015.

(51) Int. Cl.
*B62D 33/02* (2006.01)
(52) U.S. Cl.
CPC ................. *B62D 33/0207* (2013.01)
(58) Field of Classification Search
CPC ......... B60P 7/0807; B60P 3/32; B60P 7/0815; B62D 33/0207; B62D 33/02; B62D 33/0215; B62D 33/0222; B62D 33/033; B62D 29/008; B62D 27/06
USPC ............... 410/110, 116, 102, 106, 107, 111; 248/231.41, 231.9, 503, 534; 296/43, 36, 296/3, 186.5, 10, 100.18, 26.13, 37.6, 296/39.2, 50
See application file for complete search history.

(56) References Cited

U.S. PATENT DOCUMENTS

| | | | |
|---|---|---|---|
| 3,351,356 A | 11/1967 | Clark et al. | |
| 3,421,726 A | 1/1969 | Getter | |
| 3,950,010 A | 4/1976 | Robertson | |
| 4,316,688 A | 2/1982 | Roskelley | |
| 4,607,991 A | 8/1986 | Porter | |
| 5,273,382 A * | 12/1993 | Yearick | F16B 13/066 411/64 |
| 5,725,137 A * | 3/1998 | Macdonald | B60R 9/00 211/206 |
| 5,915,900 A | 6/1999 | Boltz | |
| 6,290,441 B1 * | 9/2001 | Rusu | B60P 7/0807 296/100.07 |

(Continued)

*Primary Examiner* — Darrell G Dayoan
*Assistant Examiner* — Sunsurraye Westbrook
(74) *Attorney, Agent, or Firm* — Shewchuk IP Services, LLC; Jeffrey D. Shewchuk

(57) ABSTRACT

A stake pocket anchor attaches an accessory to a vehicle stake pocket. The stake pocket anchor includes an anchor assembly hung from a tensioning member. The anchor assembly includes two channel members slidably attached to sandwich a center block, with an angled slide direction that enables sliding either upwardly and inwardly to a minimum anchor assembly width or downwardly and outwardly to a maximum anchor assembly width. During use, the anchor assembly gravitationally releases to its maximum anchor assembly width after being inserted through the stake pocket opening. The tensioning member is then used to vertically raise the anchor assembly within the stake pocket until a top of the anchor assembly contacts a bottom surface of the lip and thereafter allows further tightening of the anchor assembly against the bottom surface of the lip.

20 Claims, 6 Drawing Sheets

(56) References Cited

U.S. PATENT DOCUMENTS

| | | | |
|---|---|---|---|
| 6,464,437 B1* | 10/2002 | Elwell | B60P 7/0807 |
| | | | 410/106 |
| 7,296,837 B2* | 11/2007 | Niedziela | B60P 3/40 |
| | | | 224/405 |
| 7,594,478 B2 | 9/2009 | Karnes et al. | |
| 2008/0152452 A1* | 6/2008 | Green | B60P 3/075 |
| | | | 410/3 |
| 2015/0102077 A1* | 4/2015 | Martin | B60R 9/00 |
| | | | 224/405 |

* cited by examiner

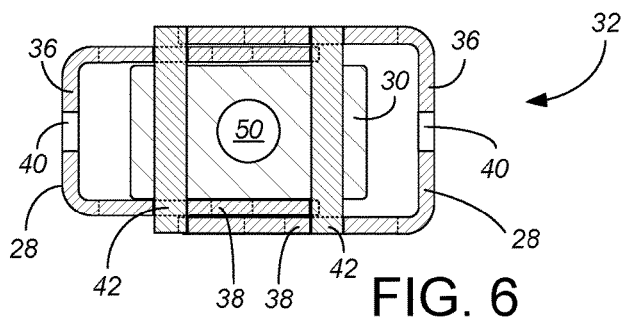
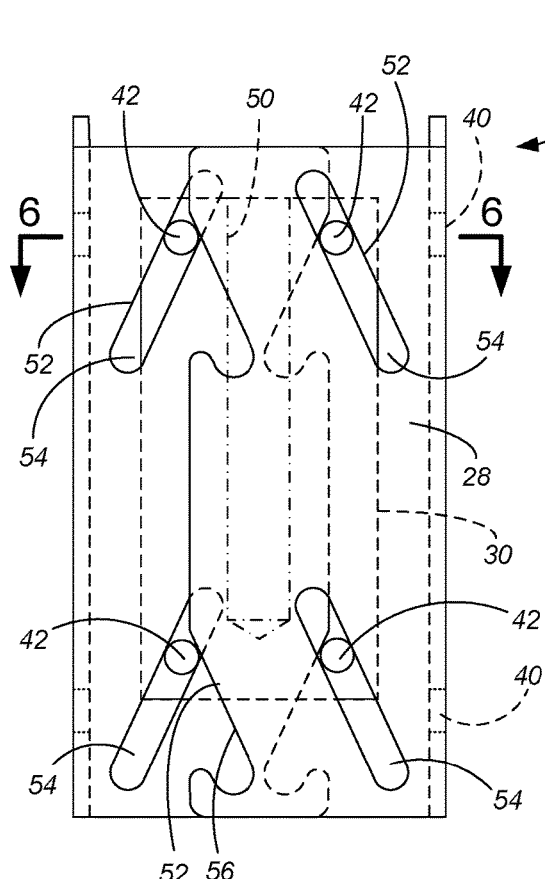
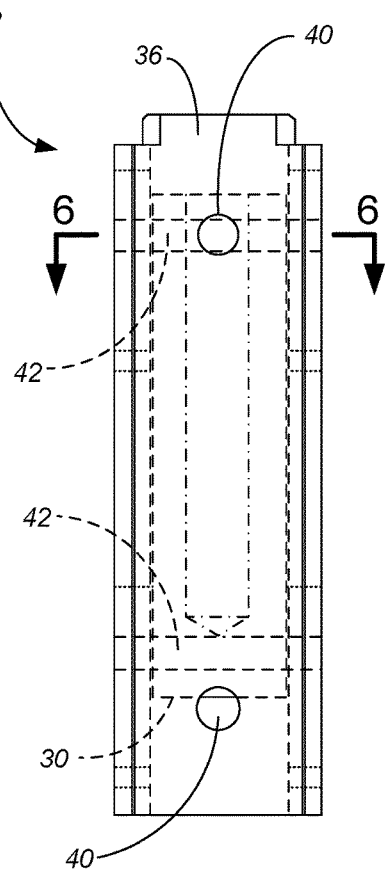

STAKE POCKET ANCHOR

CROSS-REFERENCE TO RELATED APPLICATION(S)

The present application claims priority from U.S. Provisional Application No. 62/248,514 entitled STAKE POCKET CLAMP filed Oct. 30, 2015, incorporated herein by reference.

BACKGROUND OF THE INVENTION

The present invention relates to attachment into stake pockets of vehicles such as pickup trucks, particularly for aftermarket accessories such as headache racks. For instance, the present invention can be used to attach the headache rack disclosed in U.S. patent application Ser. No. 14/887,230, incorporated by reference.

Many vehicle manufactures incorporate stake pockets into the sidewalls defining a bed used for hauling cargo. Often the stake pocket opening includes a lip which is narrower than the chamber in the interior of the sidewalls. The dimensions of stake pocket openings are not necessarily uniform between different models and manufacturers of pickup trucks. The dimensions of the chamber in the interior of the sidewalls are not necessarily uniform between different models and manufacturers of pickup trucks. Manufacturers do not necessarily adhere to tight tolerances on their stake pocket openings, and may change the exact size of stake pocket openings from year to year or even within the same model and year of the vehicle. Further, stake pockets are commonly used to support posts and similar structures which can extend a considerable distance out of the stake pocket (thereby inducing large torques and forces), which can over time and usage conditions wear or deform the stake pocket shape and dimensions.

The inconsistent (and perhaps changing-over-time) dimensions of the stake pocket opening create considerable difficulty in using the stake pockets of a pickup truck for attachment of accessories. Better mechanisms are needed for attaching accessories using the stake pockets of a pickup truck bed, which can form a consistent and sturdy attachment over years of use of the vehicle and from one vehicle to another.

BRIEF SUMMARY OF THE INVENTION

The invention is a stake pocket anchor for attaching an accessory to a vehicle stake pocket, as well as a method of manufacturing the stake pocket anchor and a method of using the stake pocket anchor. The stake pocket anchor includes an anchor assembly hung from a tensioning member. The anchor assembly allows relative sliding between a maximum anchor assembly width and a minimum anchor assembly width. In one aspect, by having an angled slide direction that enables sliding either upwardly and inwardly to a minimum anchor assembly width or downwardly and outwardly to a maximum anchor assembly width, the anchor assembly gravitationally releases to its maximum anchor assembly width after being inserted through the stake pocket opening. The tensioning member is then used to vertically raise the anchor assembly within the stake pocket until a top of the anchor assembly contacts a bottom surface of the lip and thereafter allows further tightening of the anchor assembly against the bottom surface of the lip. The stake pocket anchor thereafter provides a hold down force through tension in the tensioning member while pushing the contact members upward and outward into the stake pocket.

BRIEF DESCRIPTION OF THE DRAWINGS

FIG. 4 is a side view of the stake pocket anchor of FIGS. 2 and 3.

FIG. 5 is an end view of the stake pocket anchor of FIGS. 2-4.

FIG. 6 is a cross-sectional plan view of the stake pocket anchor of FIGS. 2-5, taken along lines 6-6.

While the above-identified drawing figures set forth a preferred embodiment, other embodiments of the present invention are also contemplated, some of which are noted in the discussion. In all cases, this disclosure presents the illustrated embodiments of the present invention by way of representation and not limitation. Numerous other minor modifications and embodiments can be devised by those skilled in the art which fall within the scope and spirit of the principles of this invention.

DETAILED DESCRIPTION OF THE PREFERRED EMBODIMENTS

Figure 1:
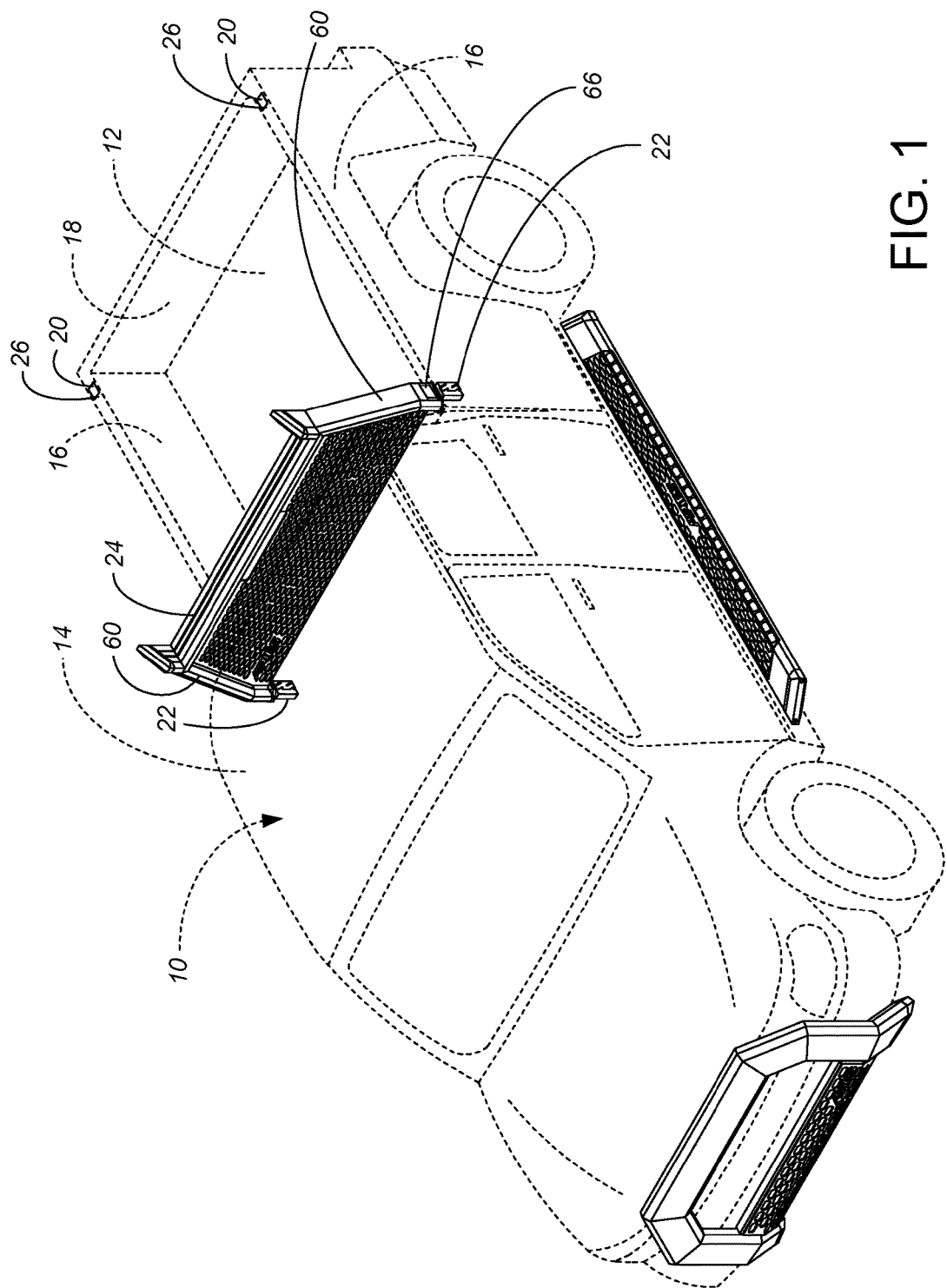
FIG. 1 is a perspective view of a pickup truck outfitted with side bars, a bull bar and a headache rack, depicting the locations of the stake pocket anchors of the present invention when used to attach the headache rack.

FIG. 1 shows a pickup truck 10, indicating the preferred environment of use of the present invention. As known in the art, the pickup truck 10 includes a bed 12 defined by the cab 14, sidewalls 16 and tailgate 18 of the pickup truck 10. The sidewalls 16 include a number of stake pockets 20 defined in the top surface of the sheet metal used for the sidewalls 16. Pickup trucks having at least four stake pockets 20 (one at the front and back of each of the two sidewalls 16) are quite common, but arrangements of six or eight stake pockets are also widely used. As shown in FIG. 1, the stake pocket anchors 22 of the present invention can be used, one in each of the stake pockets 20 in the sidewalls 16 immediately behind the cab 14, to attach a headache rack accessory 24 to the vehicle 10. However, the stake pocket anchor 22 can also be used for attaching or clamping other accessories (not shown) relative to the stake pockets 20 provided in pickup trucks.

A common shape for pickup truck stake pockets 20 is generally rectangular, such as at a stake pocket opening size of about 2.3×1.7 inches. However, this size can vary somewhat from truck manufacturer to truck manufacturer, between different models or different years from any given truck manufacturer, and even within model years. The thickness of the (typically sheet metal) lip 26 on each stake pocket 20 can also differ from truck manufacturer to truck manufacturer and between different models/years from any given truck manufacturer. The dimensions of stake pocket openings are not tightly toleranced. More importantly, stake pockets 20 are commonly subject to considerable torques, bending forces and impacts during years of use, which forces may bend the metal or otherwise deform or mangle the original dimensions or shape of the stake pockets 20.

FIGS. 2-6 better depict one of the stake pocket anchors 22 of a preferred embodiment of the present invention. In general terms, the stake pocket anchor 22 includes two opposing channel members 28 around a center block 30, collectively making up an anchor assembly 32. At least one of the channel members 28 slides or moves relative to the other channel member 28, in a length-wise or width-wise or direction, so the overall length or width of the stake pocket anchor 22 is changeable during installation into the stake pocket 20. In a narrowest position, the width/length of the stake pocket anchor 22 is smaller than the corresponding width/length of the stake pocket opening, so the stake pocket anchor 22 can be inserted into the stake pocket 20 (see FIG. 8B). In a widest position, the width/length of the stake pocket anchor 22 is larger than the corresponding width/length of the stake pocket opening, so the stake pocket anchor 22 cannot be removed from the stake pocket opening (see FIG. 8D). While the anchor assembly 32 could be formed from two parts, such as using only a single channel member 28, the use of three parts allows the width to be equally increased on each side so as to not change the balance of the stake pocket anchor 22 while it changes width. Each channel member 28 makes contact with the interior of the stake pocket 20, and most importantly with the underside of the lip 26 on the truck 10 defining the stake pocket opening, to hold the stake pocket anchor 22 down into the stake pocket 20. Thus, in the preferred embodiment each channel member 28 can be considered a contact member, with the important fact being that the stake pocket anchor 22 enlarges to a size wherein the contact members 28 make contact with the lip 26 (see FIG. 8D) on opposing sides of the stake pocket opening.

The relative movement of the channel members 28 is in a slide direction, with a preferred slide being linear. Alternatively, a curved slide motion could be used, thereby accomplishing changing rates of movement/tightening force as the stake pocket anchor 22 is tightened into its anchoring position. In either linear/curved event, the slide direction is angled relative to vertical or horizontal. The angled slide direction enables at least one of the contact members to slide either upwardly and inwardly to a minimum anchor assembly width or downwardly and outwardly to a maximum anchor assembly width. In the preferred configuration with two channel members 28, each channel member 28 slides either upwardly and inwardly to a minimum anchor assembly width or downwardly and outwardly to a maximum anchor assembly width.

Figure 2:
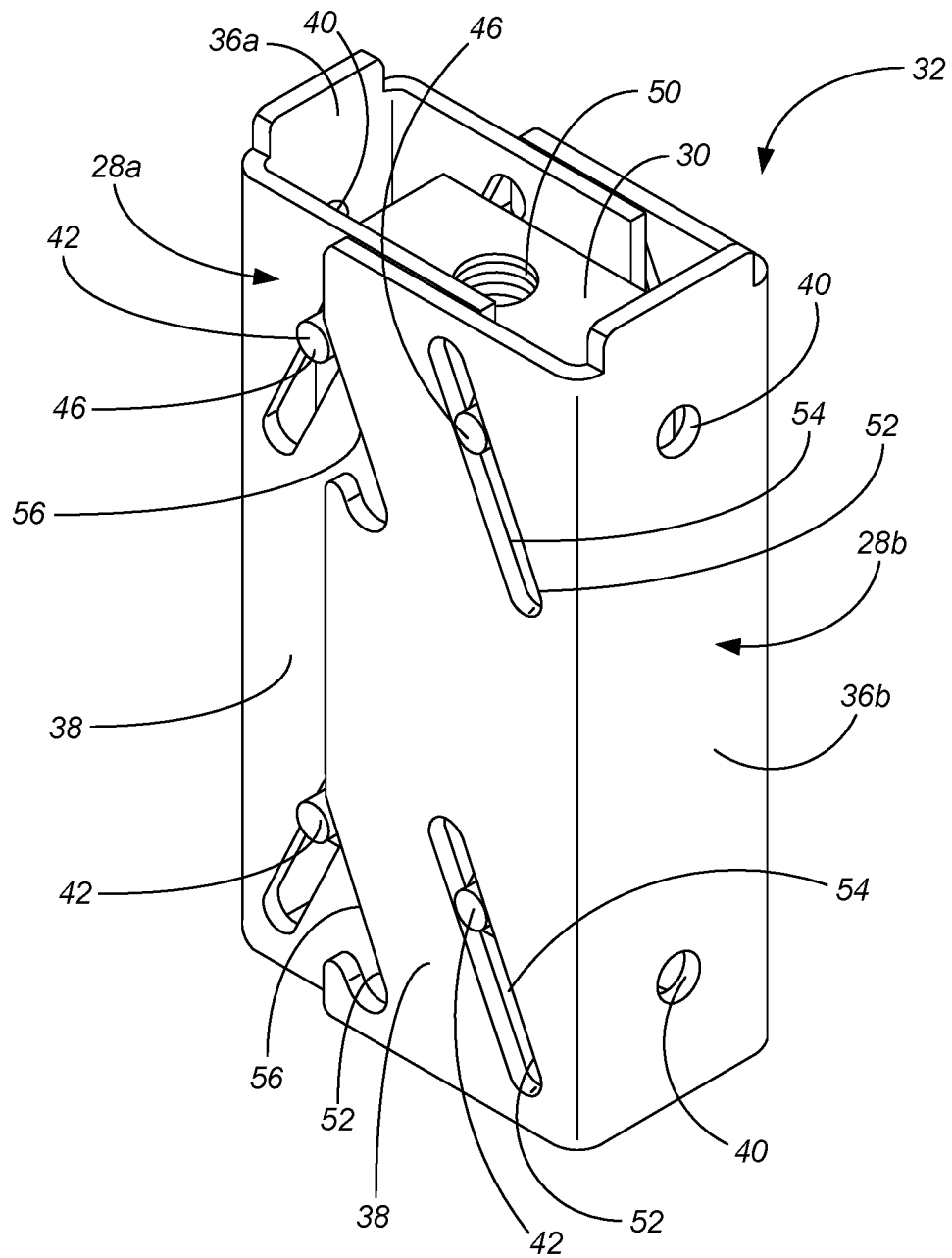
FIG. 2 is a perspective view of one of anchor assemblies of the stake pocket anchors of FIG. 1.
Figure 7:
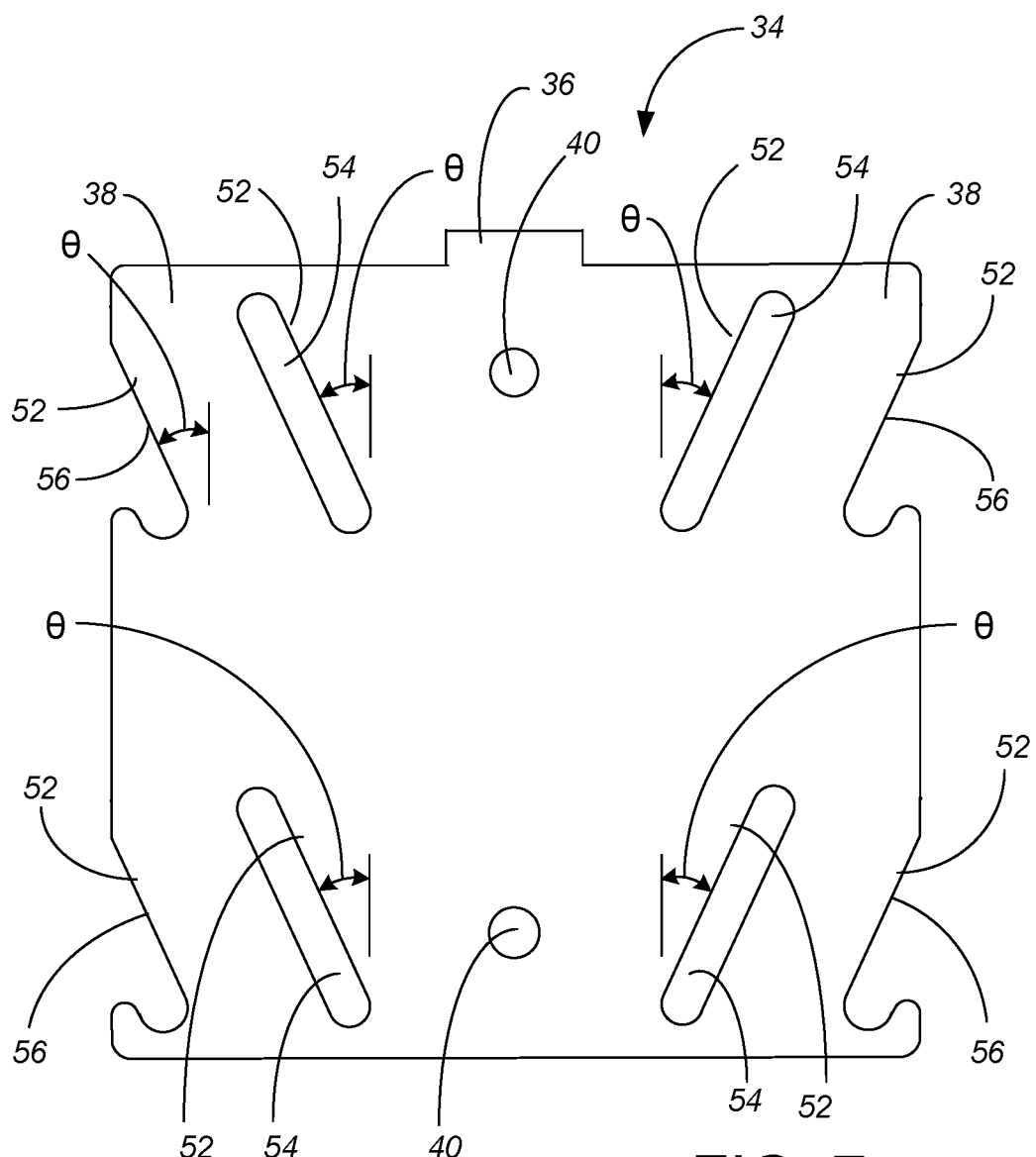
FIG. 7 is a plan view of the stamped metal blank used to create one of the channel members used in constructing the stake pocket anchor of FIGS. 2-5.

FIG. 7 shows a blank 34 used in a simple method of forming one of the channel members 28. The blank 34 can be stamped from sheet metal, such as 3 mm thick 304 stainless steel. After the blank 34 is stamped, it is bent to define a spine 36 and two parallel plate wings 38 as shown in FIGS. 2-6. The spine 36 may optionally include holes 40 for tooling, and for holding the channel members 28 in place during assembly/insertion of pins 42 into the center block 30. The preferred channel members 28 have a height which defines the height of the overall anchor assembly 32, such as a preferred height of about 5¼ inches, but any height can be used provided the anchor assembly 32 fits height-wise into a wide range of stake pockets 20 as present in pickup trucks and similar vehicles. As shown in FIG. 2, the spine 36a of one of the channel members 28a is narrower than the spine 36b of the other channel member 28b, with the preferred embodiment having an inner channel member 28a with a separation of 26 mm between its parallel plate wings 38 and an outer channel member 28b with a separation of 33 mm between its parallel plate wings 38. When assembled, the inner channel member 28a and the outer channel member 28b both sandwich the center block 30 between their parallel plate wings 38. In one alternative embodiment to minimize part inventory, instead of forming one inner channel member 28a and one outer channel member 28b, each of the channel members are formed identically with 29½ mm between their parallel plate wings 38, and then assembly interleaves the identical channel members around the center block 30.

In the preferred embodiment, the anchor assembly 32 is hung from a tensioning member 44 during use (see FIGS. 3 and 8A-8D), such that the angled slide direction uses gravitational force to naturally rest in the maximum anchor assembly width. Alternatively, a spring or other biasing member (not shown) could provide an assisting force or the only force for biasing the channel members 28 outward. In either case, a user can preferably overcome the gravitational or spring force by hand squeezing the two channel members 28 together while inserting the anchor assembly 32 downwardly into the stake pocket 20. When the user releases the anchor assembly 32, the channel members 28, due to the gravitational and/or spring force, move downwardly and outwardly within the stake pocket 20 to a size larger than the stake pocket opening.

Note that the anchor assembly 32 must once again be compressed to a size smaller than the stake pocket opening if it is ever desired to remove the anchor assembly 32 from the stake pocket 20. One downside to using a spring or other biasing member (not shown) is that this makes removal more difficult, whereas the gravitationally-positioned anchor assembly 32 of the preferred embodiment can be more easily removed (such as by using a screwdriver (not shown) inserted through the stake pocket opening to provide the compressing force required for removal), or by significantly angling the anchor assembly 32 off of vertical within the stake pocket 20.

Figure 3:
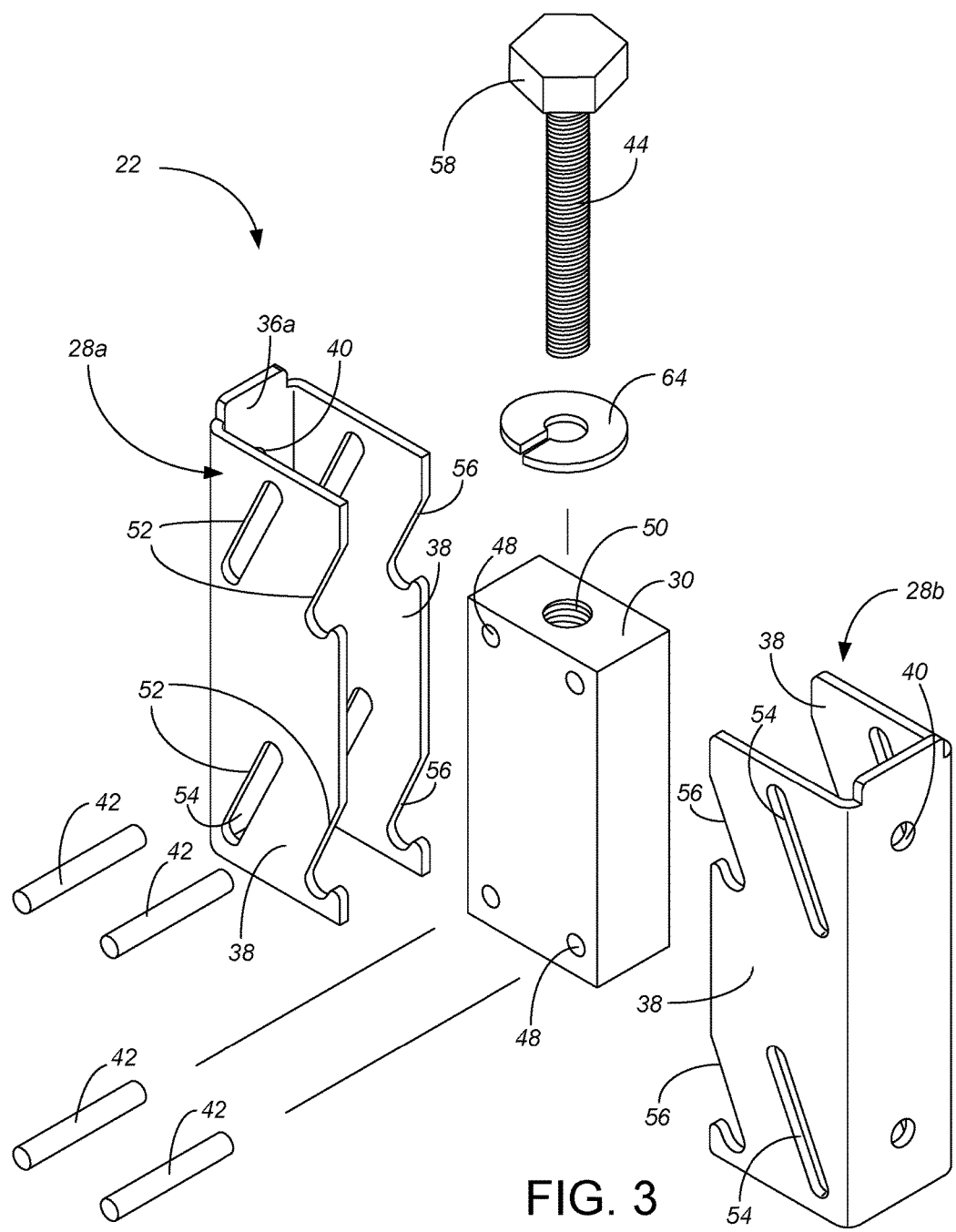
FIG. 3 is an exploded perspective view of the stake pocket anchor including the anchor assembly of FIG. 2.

In the preferred embodiment as best shown in FIG. 3, the slide direction is defined by four pins 42 in the center block 30 which extend outward in both directions, making a total of eight slide pegs 46, four on the front and four on the back of the center block 30. For ease of construction, weight and corrosion resistance, the center block 30 can be machined out of 6061 T6 Aluminum. The pins 42 can be formed from 18-8 stainless steel, which also provides corrosion resistance but makes the pins 42 stronger and harder than the material of the center block 30. Through-holes 48 for the pins 42 can be drilled into the center block 30, with the pins 42 pressed into the through-holes 48 after alignment with the channel members 28 as a means of assembly. Alternatively, the pins 42 could have a threaded connection with the center block 30, or could be adhesively attached. The pins could alternatively be an integral portion of a formed center member (such as if the center member is formed of stamped sheet metal), with the channel members 28 then separately bent around the center block 30 as a means of assembly.

A separate hole 50 can be drilled into the center block 30 which defines a vertical direction for the stake pocket anchor 22. This hole 50 can be tapped with threads which mate with the tensioning member 44.

The slide pegs 46 mate into ramp slides 52 on the channel members 28. The ramp slides 52 angle upward and inward in the channel members 28. In the preferred embodiment, four ramp slides 52 on each channel member 28 provide slide slots 54 which completely encircle the corresponding slide peg 46, while the other four ramp slides 52 are formed by an exterior edge surface 56 of the channel member 28 contacting an upwardly facing surface portion of the corresponding slide peg 46. The exterior edge surfaces 56 which ride on the slide pegs 46 are parallel to the slide slots 54, i.e., so each channel member 28 has eight points of contact at all times with the eight slide pegs 46. Different numbers of ramp slides could alternatively be used, but the eight slide peg contact has been found to produce a smooth, non-binding and robust slide connection over prolonged usage. Moreover, each of the slide pegs 46 makes contact with both of the channel members 28; while slide pegs 46 members could alternatively be dedicated for contact with only one of the channel members 28, using each slide peg 46 for both channel members 28 provides a simpler construction.

When using an angled slide direction, the angle θ of the slide direction (called out in FIG. 7) contributes to the unconstrained gravitational widening of the anchor assembly 32, and the angle θ should be sufficient to overcome friction and/or binding of the channel members 28 on the center block 30. The angle θ of the slide direction also contributes to the holding forces of the tightened anchor assembly 32, i.e., how much of the tension in the tensioning member 44 is converted into a compression force on the lip 26 of the stake pocket opening and how much is converted into a force pushing the channel members 28 wider. To best meet these considerations, the slide angle θ should be within a range of 10 to 60° to vertical, and more preferably within a range of 20 to 30° to vertical. In the preferred embodiment, the slide pegs 46 are cylindrical, and the ramp slides 52 are an angle θ of 25° to vertical. The preferred slide slots 54 are linear, with a length of about 1⅝ inches. When the slide pegs 46 are at the tops of the ramp slides 52, the channel members 28 are in their widest configuration. When the slide pegs 46 are at the bottoms of the ramp slides 52, the channel members 28 are in their narrowest configuration. The 25° to vertical, 1⅝ inch long ramp slides 52 interacting with the slide pegs 46 result in a width-wise movement of each channel member 28 of about 7/12 of an inch, i.e., a total achieveable difference in width of the anchor assembly 32 from about 2 inches (narrowest) to about 3⅙ inches (widest). This amount of width difference, including the 2 inch minimum and 3⅙ maximum width, has been found to work in stake pockets 20 of a wide range of different pickup truck makes and models in use today, including as the stake pockets 20 are worn, bent or mangled over years of use.

As shown in FIGS. 3 and 8A-8D, a bolt 44 acts as a tensioning member and has a threaded connection which mates into the center block 30. During the installation process, the bolt 44 is used for pulling the center block 30 and its slide pegs 46 upward relative to the channel members 28. While in use (FIG. 8D), the head 58 of the bolt 44 provides a hold down force for the legs 60 of the headache rack 24 or whatever accessory is being installed relative to the stake pocket 20. The tensioning member 44 thus both holds the stake pocket anchor 22 in position and provides the hold down force for the accessory being attached. Each leg 60 of the preferred headache rack 24 include a base plate 62 with a circular hole for receiving the bolt 44, and during use the base plate 62 rests on top of the stake pocket lip 26. A lock washer or spring washer 64 is preferably used with the bolt 44 to help prevent the bolt 44 from loosening during vehicle vibration. When installed into the leg 60 of the headache rack 24, the bolt head 58 is above the base plate 62, with the bolt 44 extending through the base plate 62 into the center block 30 of the assembled stake pocket anchor 22. The head 58 of the bolt 44 is accessible through a hole 66 (FIG. 1) in the side of the base extrusion 60. In the preferred embodiment, the bolt 44 is a common standard hex head cap screw bolt, such as a 18-8 stainless steel bolt with an 80 mm M14×2 class 6G thread, mating into a corresponding female threaded hole 50 drilled and tapped into the center block 30. Many other structures could alternatively be used as the tensioning member instead of the bolt 44, providing they allow for pulling the anchor assembly 32 upward while extending through the stake pocket opening. For one example, the center block (or a neck of the center block) could extend upwardly and through the stake pocket opening while the channel members 28 are within the stake pocket 20, with a cam arrangement or other mechanical linkage for raising the center block, and for tightening and holding the center block elevation in place after tightening. With the tensioning member extending through the stake pocket opening, the tensioning member must be smaller in horizontal cross-sectional size than the stake pocket opening.

FIGS. 8A-D provide a series of side views which further show the relative positioning of the stake pocket anchor 22 in tightening and holding the accessory 24 down by the stake pocket 20. First in the step of FIG. 8A, the bolt 44 is positioned so it extends through the base plate 62, head 58 on top. The bolt 44 is threaded into the center block 30 with the center block 30 below the base plate 62. The two channel members 28 (after manufacturing plant assembly) merely hang from the center block 30, causing the channel members 28 to be at their widest position.

Figure 8A:
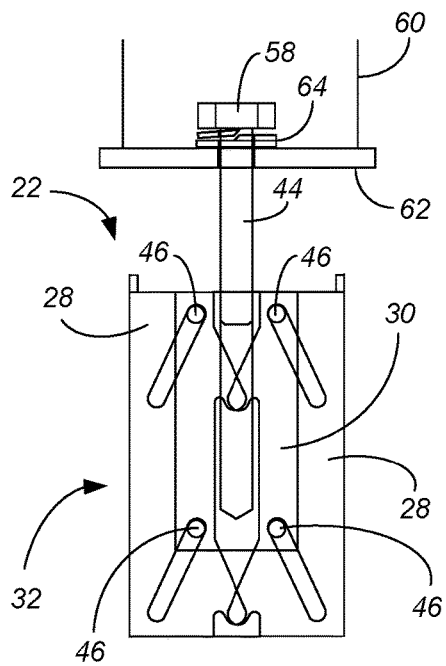
FIG. 8A-8D are a series of simplified schematic side views showing movement of the stake pocket anchor of the present invention in attaching an accessory to a vehicle.
Figure 8B:
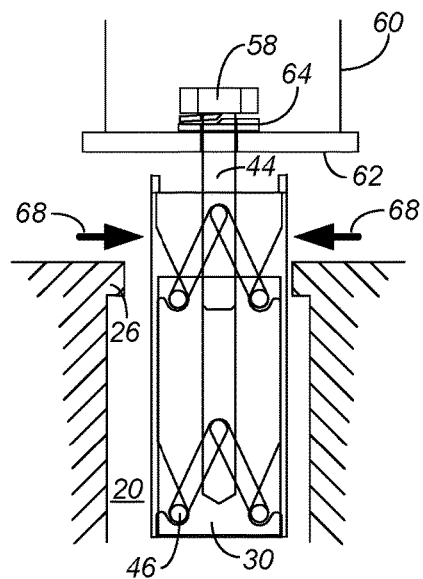

In the step of FIG. 8B, the user pushes the channel members 28 by hand together as shown by the arrows 68 to place the channel members 28 into the stake pocket 20. As depicted, the stake pocket 20 has a lip 26. Importantly, the stake pocket and lip dimensions may differ from vehicle to vehicle and even on the same vehicle over time, and so are not known during construction of the stake pocket anchor 22. However, the stake pocket anchor 22 shown works in stake pockets 20 and lips 26 over a wide variance in dimensions, as long as the stake pocket width is less than the fully spread dimension of the two channel members 28.

Figure 8C:
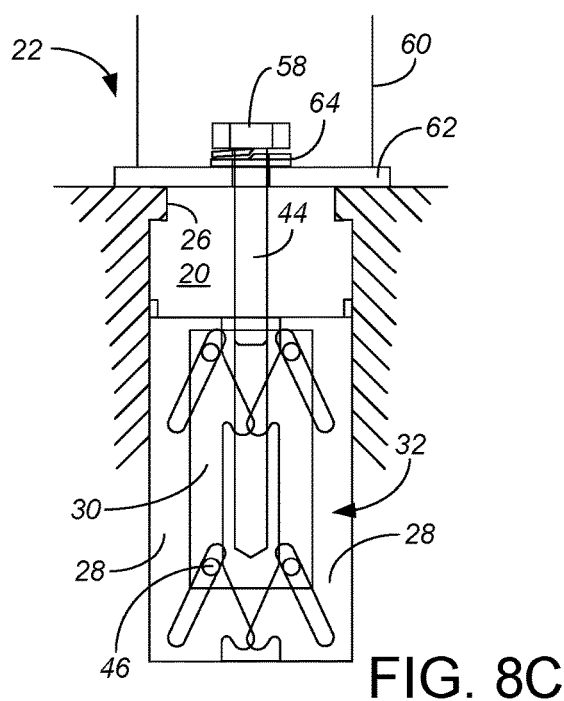

In the step of FIG. 8C, the user releases the hand pressure on the two channel members 28, and the channel members 28 slide downward and outward on the slide pegs 46. The downward and outward sliding of the channel members 28 continues until the channel members 28 are widened to whatever the width dimension of the stake pocket 20 is and make contact with the dividing or frame structures interior to the sidewalls 16 of the vehicle 10 (i.e., until contacting the side of the stake pocket 20 beneath the lip 26), or until the anchor assembly 32 is at its widest position.

Figure 8D:
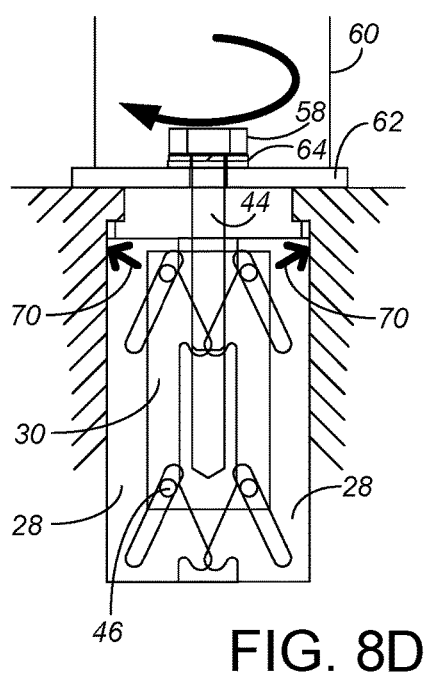

The user then tightens the bolt 44 as shown in the step of FIG. 8D, such as with a wrench (not shown) extending through the hole 66 (FIG. 1) in the base extrusion 60 of the headache rack 24. Initially while the bolt 44 is rotated relative to the center block 30, the bolt 44 merely pulls both the center block 30 and the two channel members 28 upward without changing the width/separation of the two channel members 28. This vertical raising of the anchor assembly 32 continues until the tops of the channel members 28 contact the bottom surface of the lip 26 (and regardless of the thickness of the lip 26). If no lip is present on the stake pocket 20 or the lip 26 is only present on one side, tightening of the bolt 44 will pull the center block 30 and two channel members 28 upward until one or both tops of the channel members 28 contacts the base plate 62. In other words, the stake pocket anchor 22 fully functions even if one of the channel members 28 is raised further than the other channel member 28. Further tightening of the bolt 44 uses the tensile force of the bolt 44 against the spring force of the lock washer 64, biasing the center block 30 and its slide pegs 46 upward, with the slide pegs 46 in turn biasing the channel members 28 upward and outward into the stake pocket 20 in the direction shown by the arrows 70 in step D. The base plate 62 of the accessory 24 is larger than stake pocket opening and preferably rides on top of the stake pocket opening. With its bottom surface resting on top of the lip 26, the tightening force of the stake pocket anchor 22 acts in direct compression of the sheet metal of the lip 26, so tightening does not tend to cause bending of the lip 26 and instead tends to counteract any deformation of the lip 26 which may have previously occurred during usage of the vehicle 10. After the bolt 44 is fully tightened, a base cover (not shown) can be attached onto the leg 60 of the headache rack 24 to protect and cover the head 58 of the bolt 44.

By virtue of this description, it should be understood that the stake pocket anchor 22 of the present invention can be used with a wide variety of differently dimensioned stake pockets in the sidewalls of pickup trucks to secure an aftermarket accessory using the pickup truck stake pockets. The preferred length, angle and linearity of the ramp slides 52 has be found to work very well without binding to provide the desired securing force, but it should be understood that different lengths, angles and curvatures could be used to achieve different flexibilities in use of the stake pocket anchor.

Although the present invention has been described with reference to preferred embodiments, workers skilled in the art will recognize that changes may be made in form and detail without departing from the spirit and scope of the invention.

What is claimed is:

1. A stake pocket anchor for attaching an accessory to a vehicle stake pocket, the vehicle stake pocket having a stake pocket opening with a lip, the stake pocket anchor comprising:
   an anchor assembly comprising at least two contact members slidably joined together with an angled slide direction that enables at least one of the contact members to slide either upwardly and inwardly to a minimum anchor assembly width or downwardly and outwardly to a maximum anchor assembly width, the relative sliding enabling hand compression sliding upwardly and inwardly to a size so the anchor assembly can be inserted downwardly into the stake pocket opening and then released beneath the lip for gravitational sliding downwardly and outwardly within the stake pocket to a size larger than the stake pocket opening; and
   a tensioning member connected to the anchor assembly from which the anchor assembly is hung, the tensioning member being able to transmit a tension force in a vertical direction, the tensioning member being smaller in horizontal cross-sectional size than the stake pocket opening, wherein the tensioning member while extending through the stake pocket opening permits vertical raising of the anchor assembly within the stake pocket until a top of the anchor assembly contacts a bottom surface of the lip and thereafter allows further tightening of the anchor assembly against the bottom surface of the lip to provide a hold down force through tension in the tensioning member while forcing the contact members upward and outward into the stake pocket.

2. The stake pocket anchor of claim 1, wherein the anchor assembly comprises two contact members each slidably mounted on a center block, wherein each of the contact members can slide either upwardly and inwardly or downwardly and outwardly, and wherein each of the contact members provides a portion of the top of the anchor assembly, such that while providing the hold down force each of the contact members provides a portion of the top of the anchor assembly.

3. The stake pocket anchor of claim 2, wherein each of the contact members comprises two rigidly connected parallel plate wings extending from a spine, and wherein the anchor assembly comprises a center block sandwiched between the two parallel plate wings of each of the contact members.

4. The stake pocket anchor of claim 2, wherein each of the contact members include at least two slide slots, and wherein each of the contact members is slidably mounted on the center block by a peg projecting into each slide slot.

5. The stake pocket anchor of claim 1, wherein said at least one of the contact members comprises two rigidly connected parallel plate wings, and wherein the anchor assembly comprises a center block sandwiched between the two parallel plate wings.

6. The stake pocket anchor of claim 1, wherein the angled slide direction is within a range of 10 to 60° to vertical.

7. The stake pocket anchor of claim 6, wherein the angled slide direction is defined by a peg within a slide slot.

8. The stake pocket anchor of claim 7, wherein the angled slide direction is within a range of 20 to 30° to vertical.

9. The stake pocket anchor of claim 1, wherein the angled slide direction is defined by a peg within a slide slot of said at least one of the contact members, and wherein said at least one of the contact members comprises an exterior edge surface parallel with the slide slot which rides on a second peg.

10. The stake pocket anchor of claim 9, wherein another of the contact members comprises its own slide slot receiving the second peg.

11. The stake pocket anchor of claim 1, wherein the tensioning member comprises a bolt which can be rotated to vertically raise the anchor assembly within the stake pocket.

12. The stake pocket anchor of claim 1, further comprising a base plate larger than stake pocket opening, the base plate having an opening through which the tensioning member extends, with the base plate having a bottom surface which is placed on top of the lip.

13. A method of attaching an accessory to a vehicle stake pocket, comprising:
   hand compressing at least two contact members of an anchor assembly together, so the anchor assembly has a size which can be inserted downwardly through a stake pocket opening with a lip into the vehicle stake pocket;
   releasing the two contact members of the anchor assembly, so at least one of the contact members gravitationally slides downwardly and outwardly beneath the lip, and so the anchor assembly is hung from a tensioning member extending through the stake pocket opening;
   vertical raising of the anchor assembly within the stake pocket until a top of the anchor assembly contacts a bottom surface of the lip and thereafter allows further tightening of the anchor assembly against the bottom surface of the lip to provide a hold down force through tension in the tensioning member while forcing the contact members upward and outward into the stake pocket; and
   using the hold down force to attach an accessory to the vehicle.

14. The method of claim 13, wherein the tensioning member is a bolt having a screw thread which mates with the anchor assembly, and wherein vertical raising of the anchor assembly is achieved by rotating the bolt.

15. The method of claim 13, wherein the two contact members are slidably joined together, with both contact members having opposing angled slide directions that enable each of the contact members to slide either upwardly and inwardly to a minimum anchor assembly width or downwardly and outwardly to a maximum anchor assembly width.

16. The method of claim 15, wherein the stake pocket has a stake pocket width which is wider than the stake pocket opening but narrower than the maximum anchor assembly width, and wherein upon releasing the two contact members the two contact members slide downwardly and outwardly until contacting sides of the stake pocket beneath the lip.

17. The method of claim 13, wherein the accessory is a headache rack.

18. A method of manufacturing a stake pocket anchor, the method comprising:
    forming a plurality of angled slots in parallel walls of a contact member; and
    attaching the contact member so it is slidably mounted on a center block, with the center block being sandwiched between the parallel walls of the contact member, by attaching a peg through each angled slot into the center block, so the contact member can slide either upwardly and inwardly to a minimum anchor assembly width or downwardly and outwardly to a maximum anchor assembly width.

19. The method of manufacturing a stake pocket anchor of claim 18, further comprising:
    tapping a hole into the center block to define a vertical direction, wherein the angled slots define an angled slide direction within a range of 10 to 60° to vertical; and
    threading a bolt having a head into the tapped hole, so rotation of the bolt relative to the center block draws the center block nearer to or further from the head of the bolt, while the contact member can independently slide relative to the center block.

20. The method of manufacturing a stake pocket anchor of claim 18, wherein the forming a plurality of angled slots in parallel walls of a contact member comprises stamping angled slots into sheet metal and bending the stamped sheet metal to define parallel walls.

* * * * *